United States Patent [19]

Mortensen

[11] Patent Number: 4,632,661

[45] Date of Patent: Dec. 30, 1986

[54] METHODS FOR STRUCTURALLY PERFORMING DIFFERENTIAL CALCULUS

[75] Inventor: Vernon J. Mortensen, Coeur d'Alene, Id.

[73] Assignee: Mortensen Educational Products, Inc., Chatsworth, Calif.

[21] Appl. No.: 792,438

[22] Filed: Oct. 29, 1985

[51] Int. Cl.⁴ .......................................... G09B 19/02
[52] U.S. Cl. .................................... 434/188; 434/208
[58] Field of Search ............... 434/188, 191, 195, 208, 434/210, 211, 212

[56] References Cited

U.S. PATENT DOCUMENTS 3,131,488  5/1964  Slater ................................ 434/195
3,423,849  1/1969  Jordan et al. ..................... 434/188
3,858,332  1/1975  Rasmussen ....................... 434/211

Primary Examiner—William H. Grieb
Attorney, Agent, or Firm—Wells, St. John & Roberts

[57] ABSTRACT

Methods for structurally differentiating functional relationships between two ordered sets of numbers related as x and one or more functions of x. The methods employ constructing sets of structural elements into parallelograms and any remainder portions. The parallelograms are constructed with at least one side of each having the same lengths or number of units. The structural elements of the sets are also arranged so that any remainder portions of both sets are also equal. The difference in total number of parallelogrammic units is then computed and divided by the difference in the variable x to produce the derivative value sought.

9 Claims, 10 Drawing Figures

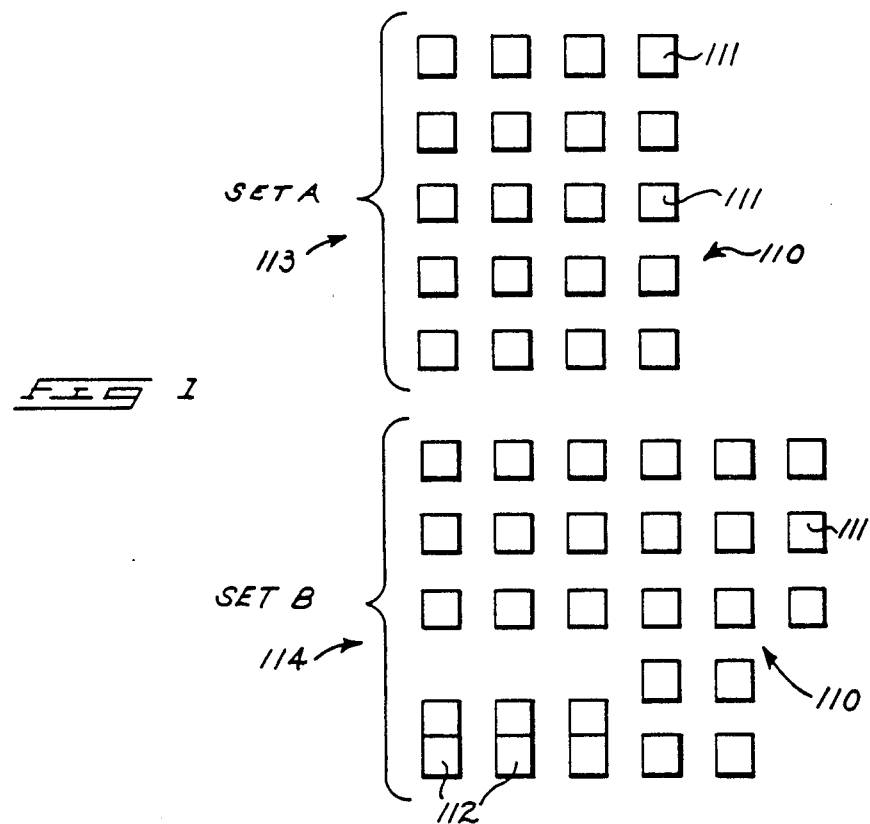
FIG 1
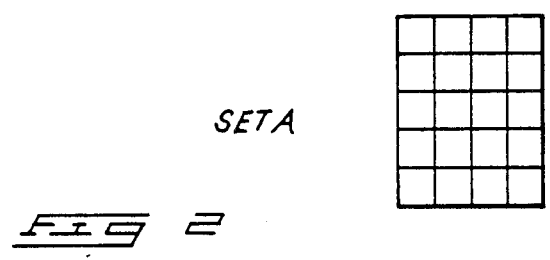
SET A
FIG 2
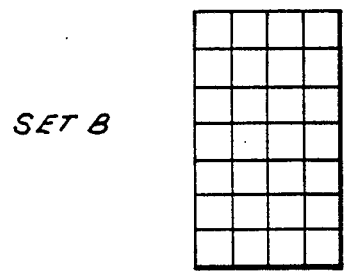
SET B

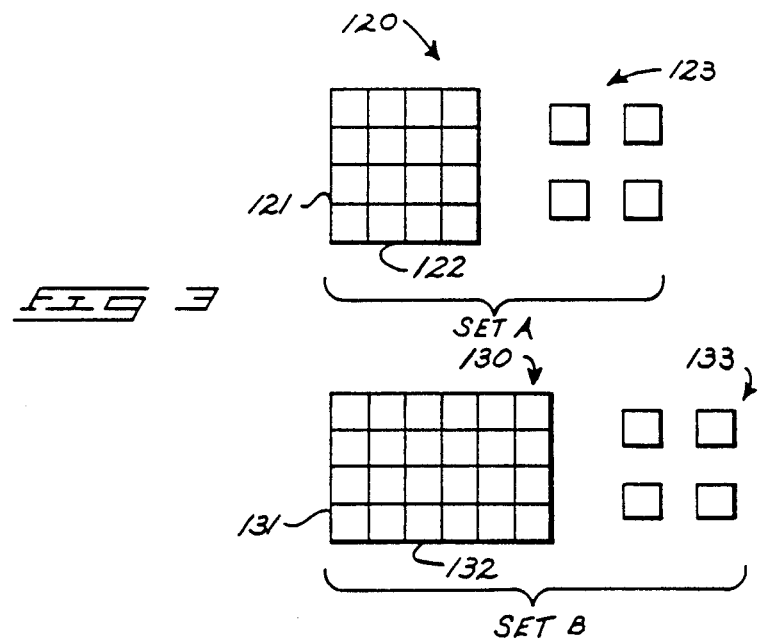
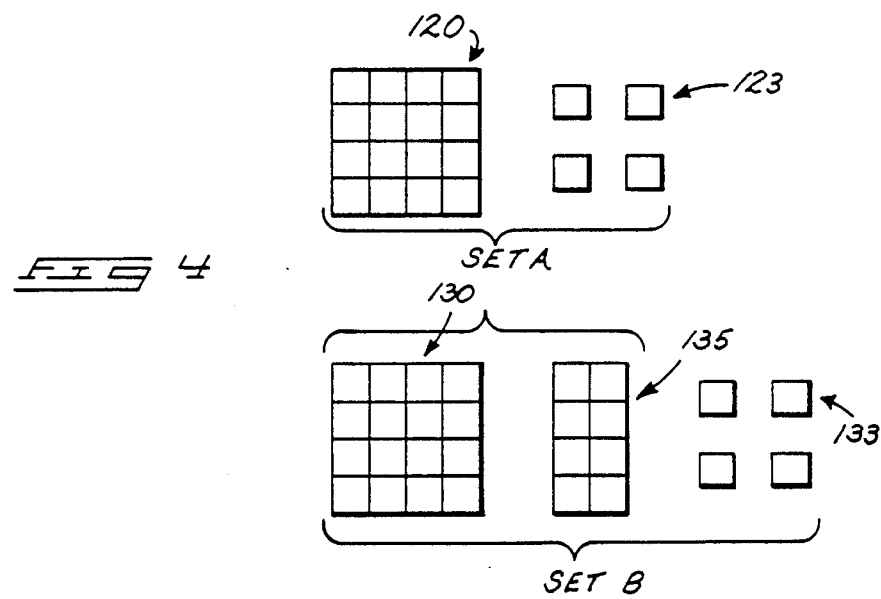

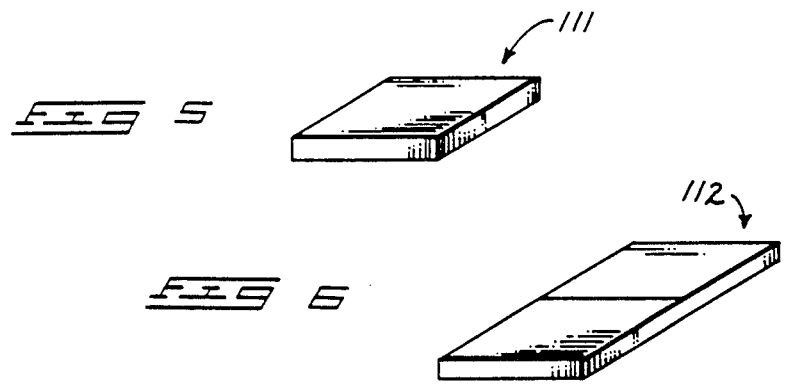
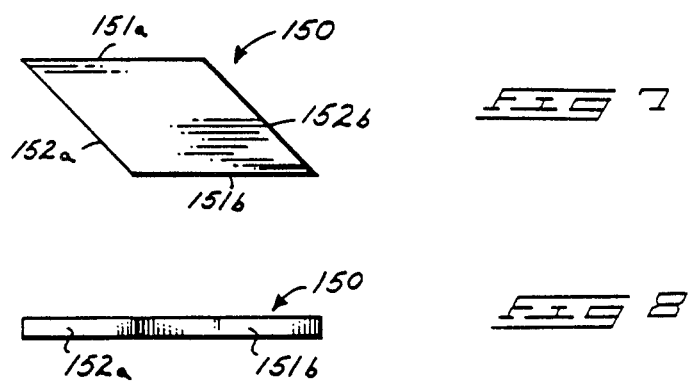
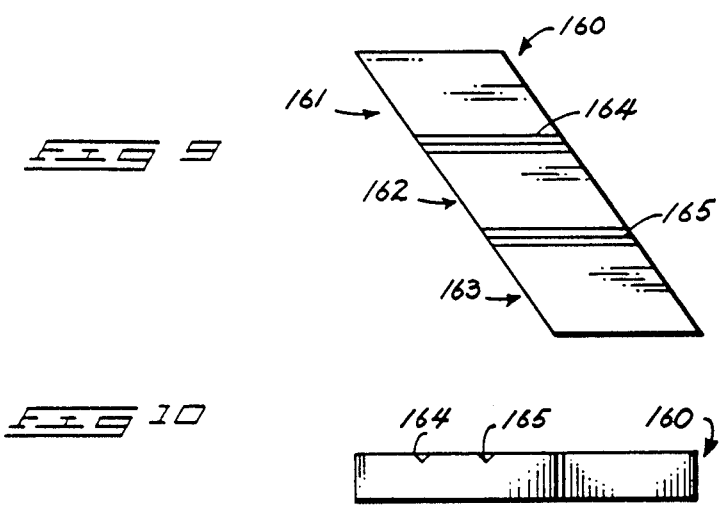

METHODS FOR STRUCTURALLY PERFORMING DIFFERENTIAL CALCULUS

TECHNICAL FIELD

The technical field of this invention includes methods for performing mathematical computations using parallelogrammic structural elements, to produce a value for the derivative of a function relating two or more ordered sets of points.

BACKGROUND OF THE INVENTION

Current methods for determining a mathematical derivative of a linear function defined by two or more points usually involve first determining the mathematical expression of the linear function and then recognizing the coefficient of the variable as the slope or derivative of the function. Such a technique fails to provide a structural basis for understanding the derivative operation and is not performed using manipulative elements important to learning for many individuals.

BRIEF DESCRIPTION OF THE DRAWINGS

The drawings included herewith illustrate preferred methods according to this invention. Included are the following:

FIG. 1 shows two different sets of structural elements unarranged in preparation for use as an apparatus useful in solving a derivative problem according to the methods of this invention;

FIG. 2 shows the sets of structural elements of FIG. 1 arranged into the largest parallelograms possible for each set;

FIG. 3 shows the sets of structural elements of FIGS. 1 and 2 rearranged into parallelograms each having one side with a common length, and with each having a remainder portion subset of equal number of parallelogram units;

FIG. 4 shows the sets of structural elements of FIGS. 1-3 rearranged to more clearly indicate the difference portion between the first and second parallelogram;

FIG. 5 is an enlarged perspective view of one form of structural element used in the method illustrated in FIGS. 1-4;

FIG. 6 is an enlarged perspective view of a further form of structural element used in the method illustrated in FIGS. 1-4;

FIG. 7 is a plan view of an alternative non-rectangular parallelogramic structural element useful in the methods of this invention;

FIG. 8 is a side elevation view of the embodiment of FIG. 7;

FIG. 9 is a plan view of a further alternative non-rectangular structural element useful in the methods of this invention; and FIG. 10 is a side elevational view of the embodiment of FIG. 9.

DETAILED DESCRIPTION OF THE PREFERRED EMBODIMENTS

Methods according to this invention allow graphic structural solutions for the class of problem including finding the derivative or an approximation thereof an equation defined by sets of two or more ordered points. These methods for solving this class of problems provide methods which are an alternative to previous purely mathematical techniques. These structural methods also are very helpful at providing tactile or manipulative experience for the problem solver which facilitates learning and memory of the mathematical operation being performed using the structural elements. The methods also are helpful in providing a greater understanding of physical relationships which are foundations for the mathematical relationships relevant to the solution of these problems.

FIG. 1 shows structural elements 110 useful in practicing methods according to this invention. Structural elements 110 include both unit squares 11 and rectangular units 112 which are one unit wide and two units high.

The structural elements 110 shown in FIG. 1 are arranged into two sets, labeled set A and set B. Set A relates to an ordered pair of numers (4,20) which identifies one point along a line represented by a function, f(x). The number "4" of pair (4,20) indicates the x value. The number "20" indicates the value of f(x) when x is equal to 4. The set of structural elements 113 representing set A includes 20 distinct unit square elements 111, corresponding to the value, 20, of f(x=4). Unit square elements 111 can be relatively thick and shaped such as a block or can be infinitesimally thin. Other alternative parallelogrammic shapes are also possible, some of which will be further described.

Set B relates to an ordered pair of numbers (6,28) which identifies another point represented by the function, f(x). The number "6" of pair (6,28) indicates the x value, and the number "28" indicates the value of f(x) when x is equal to 6. The set of structural elements 114 representing set B includes 22 individual unit squares 111 and 3 rectangular elements 112.

The area of rectangular elements 112 is 2 square units, or more generally, two parallelogrammic units. The total value attribued to the structural elements having dimensions greater than unity can generally be described as a certain number of parallelogrammic units. The actual surface area of the parallelogrammic units varies depending on the particular shape of the parallelogram involved, with right angle parallelograms (rectangles) having equal areal and parallelogramic values while oblique parallelograms will not have equal areal and parallelogrammic unit values. The number of parallelogrammic units, as used herein, will remain the product of two adjacent sides of the parallelogram.

Methods according to this invention include constructing a rectangular or other parallelogram using a plurality of structural elements. FIG. 2 illustrates that sets A and B can be arranged into rectangles which include all of the structural elements therein. The methods of this invention, however, generally suggest that the elements 110 be rearranged in order to more clearly illustrate the derivative answer for which this multi-element apparatus is being used. The methods require that the first parallelogram have a first side equal to the first value of the ordered pair. In the case of set A the first side must equal 4. The second side must have a value which when multiplied times the first side length results in a product which does not exceed the second value of the first ordered pair or set of numbers. In the case of set A the product limit is 20, the value of f(x=4). Thus the arrangement shown in FIG. 2 for set A is the largest rectangle possible.

The method further includes constructing a first set of structural elements including the first parallelogram and a remainder portion. The remainder portion includes all structural elements which are not arranged into the rectangle or other parallelogram associated with that set. In the case of set A there is no remainder portion as arranged in FIG. 2 because 4 and the number 5 produce the product 20 which is identically equal to the value of f(x) at x equal to 4. However, set A can be rearranged to form a remainder portion as explained below.

The method further involves constructing a second rectangle or other parallelogram relating to the second set, such as ordered pair (6, 28). The second parallelogram is constructed as defined by third and fourth side lengths associated with adjacent sides of the parallelogram. The second parallelogram is constructed such that the third side has a length equal to the first side of the first parallelogram.

The fourth side length is limited by either or both of two factors. First, the fourth side length must not be such that the product of the third and fourth side lengths is greater than the value of f(x) for the x value associated with the second set. Secondly, the second set is divided into both a second parallelogram and a second remainder portion. The second remainder portion must in the final arrangement of structural elements contain the same number of parallelogrammic units as the first remainder portion associated with the first set.

To exemplify practice of one method of this invention refer to FIG. 2. In that Fig. both set A and set B include rectangles which include all of the elements of each set. The first side is defined by the unit length 4 and is chosen to be for purposes of this example the vertical dimension. Accordingly, set A is rearranged to be square 120 of size 4 units by 4 units, as shown in FIG. 3. The first remainder portion 123 is thus equal to the difference between the second value of ordered set (4,20), namely, 20, less the units included in first parallelogram 120. This is equal to 20 less 16 or 4, thus producing the remainder value of 4 parallelogrammic units.

The second set B is also structured with a second remainder equal to the first remainder, namely, 4 parallelogrammic units. The second parallelogram or rectangle 130 is constructed with the third side equal to the first side of the first parallelogram, namely, 4. The fourth side of parallelogram 130 thus is constructed as equal to six units, as shown in FIG. 3, so that the total number of parallelogrammic units in set B equals 28.

It is preferable when constructing the two sets into the configurations of this method to orient the first and third parallelogram sides 121 and 131 in such a way that easy comparison between the parallelograms is possible, such as shown in FIG. 3 with both such sides being vertical.

The preferred method further involves comparing the parallelogrammic unit difference occurring between the first and second parallelograms, such as between 120 and 130. This difference is illustrated in FIG. 4 by difference quantity 135. It can be recognized from sight that for each change in the first value of the ordered sets that there is a corresponding change in the second value of 4 parallelogrammic units. Alternatively, difference quantity 135 contains 8 parallelogrammic units since it has dimensions 4 by 2 units. The units contained in the difference quantity can also be directly counted and the difference quantity can be divided by the change in the first value or x amount. In the illustrated case the x amount has increased 2 units, from 4 to 6. This x difference is divided into the parallelogrammic unit difference to obtain the derivative being sought. In the illustrated case the parallelogrammic difference of 8 is divided by the x difference of 2 to give a derivative of 4.

It will be apparent that not only the square and rectangular structural elements 111 and 112 are useful in the methods of this invention. Alternatively, the method may employ oblique parallelogrammic elements such as 150 and 160 as shown in FIGS. 7–10. Unit parallelogram element 150 is shown in FIG. 7 having parallel faces 151a and b and adjacent faces 152a and b which are also parallel.

FIG. 9 shows an alternative oblique parallelogrammic element 160 having a value of three parallelogrammic units. Although not necessary, element 160 is advantageously divided into three subsections 161–163. These subsections are advantageously divided for visual purposes by grooves 164 and 165. Alternative means such as ink lines, ridges or otherwise may also be employed to clearly indicate the parallelogrammic value associated with the element.

I claim:

1. A method for structurally differentiating between a plurality of ordered sets of numbers, each ordered pair of numbers having a first value and a second value which is a function of said first value, the differential of said function being the determined value; said method using a plurality of parallelogrammic structural elements which are manipulated to derive the determined value, the parallelogrammic structural elements having an associated number or parallelogram units equal to the product of two adjacent sides of the parallelogrammic structural element; comprising:

constructing a first parallelogram from a plurality of said structural elements; said first parallelogram having a first side length equal in length to the first value of a first ordered set of numbers; said first parallelogram having a second side angled with respect to said first side, and having a second side length which when multiplied times the first side length results in a product parallelogrammic unit value which does not exceed the second value of said first ordered set of numbers;

constructing a first set of structural elements including said first parallogram and a first remainder portion having parallelogrammic structural elements defining a remainder quantity of parallelogram units equal to the difference between said second value of the first ordered set of numbers and said product parallelogrammic unit value;

constructing a second set of structural elements associated with a second ordered set of numbers, including a second parallelogram and a second remainder portion; the total parallelogrammic unit value sum of the second rectangle and the second remainder portion being equal to the second value of the second ordered set of numbers; the second parallelogram being defined by third and fourth side lengths, said third side length being equal to said first side length of said first parallelogram; said second remainder portion being equal in parallelogrammic unit value to said first remainder portion;

measuring the parallelogrammic unit difference between said second parallelogram and said first parallelogram to determine a parallelogrammic unit difference; and identifying the change in parallelogrammic unit value between said first and second parallelograms per change in the length between said second and fourth sides.

2. The method of claim 1 wherein the method further comprises at least one adjustment step wherein the first and second parallelograms and the first and second remainder portions are adjusted by moving parallelogrammic structural elements within said first and second sets of structural elements between their respective parallelogram and remainder portions to achieve relationships defined hereinabove.

3. The method of claim 1 wherein said parallelogrammic structural elements are unitary in length along all sides thereof.

4. The method of claim 1 wherein said parallelogrammic structural elements include at least one element having a parallelogrammic unit value greater than one, and at least one element having unitary length along all sides thereof.

5. The method of claim 1 wherein said first, second, third, and fourth side lengths are integer values.

6. A method for structurally differentiating between a plurality of ordered pairs of numbers, each pair having a first integer value and a second integer value which is a function of said first integer value, the differential of said function being the determined value; said method using a plurality of rectangular structural elements each having sides equal in length to an integer multiple of a unitary value; comprising:

constructing a first rectangle from a plurality of said structural elements; said first rectangle having a first side length equal in length to the first integer value of a first ordered pair; said first rectangle having a second side orthogonal to said first side, and having a second integer side length which when multiplied times the first side length results in a parallelogrammic value product which does not exceed the second integer value of said first ordered pair;

constructing a first set of structural elements including said first rectangle and a first remainder portion having rectangular structural elements with parallelogrammic value equal to the difference between the second integer value of the first ordered pair and said parallelogrammic value product;

constructing a second set of structural elements including a second rectangle and a second remainder portion; the total parallelogrammic value of the second rectangle and the second remainder portion being equal to the second integer value of a second ordered pair; the second rectangle being defined by third and fourth side lengths, said third side length being equal to said first side length of said first rectangle; said second remainder portion being equal in parallelogrammic value to said first remainder portion;

measuring the parallelogrammic value difference between said second rectangle and said first rectangle to determine a parallelogrammic value difference factor; and dividing said parallelogrammic value difference factor by a side length difference factor defined as equaling the difference between said fourth side length less said second side length; to provide the differential of said function between said first and second ordered pairs.

7. The method of claim 6 wherein the method further comprises at least one adjustment step wherein the first and second rectangles and the first and second remainder portions are adjusted by moving rectangular structural elements within said first and second sets between their respective rectangles and remainder portions to achieve relationships defined hereinabove.

8. The method of claim 6 wherein said rectangular structural elements are unitary in length along all sides thereof.

9. The method of claim 6 wherein said rectangular structural elements include at least one element having an areal value greater than one, and at least one element having unitary length along all sides thereof.

* * * * *